United States Patent
Balassanian (10) Patent No.: US 9,848,031 B2
(45) Date of Patent: *Dec. 19, 2017

(54) APPLICATION SERVER FOR DELIVERING APPLETS TO CLIENT COMPUTING DEVICES IN A DISTRIBUTED ENVIRONMENT

(71) Applicant: Implicit, LLC, Seattle, WA (US)

(72) Inventor: Edward Balassanian, Seattle, WA (US)

(73) Assignee: Implicit, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/134,555

(22) Filed: Apr. 21, 2016

(65) Prior Publication Data

US 2017/0019456 A1 Jan. 19, 2017

Related U.S. Application Data

(63) Continuation of application No. 14/507,394, filed on Oct. 6, 2014, now Pat. No. 9,325,740, which is a
(Continued)

(51) Int. Cl.
  *G06F 9/445* (2006.01)
  *H04L 29/08* (2006.01)
  *H04L 29/06* (2006.01)

(52) U.S. Cl.
  CPC .............. *H04L 67/02* (2013.01); *G06F 9/445* (2013.01); *G06F 9/44526* (2013.01);
(Continued)

(58) Field of Classification Search
  CPC ................................. G06F 9/445; H04L 67/02
(Continued)

(56) References Cited

U.S. PATENT DOCUMENTS 5,706,502 A   1/1998   Foley et al.
5,727,159 A   3/1998   Kikinis
(Continued)

FOREIGN PATENT DOCUMENTS

JP   H10-49354   2/1998
JP   H10-55279   2/1998
(Continued)

OTHER PUBLICATIONS

Pal, "A Flexible, Applet-like Software Distribution Mechanism for Java Applications", ACM SIGSOFT Software Engineering Notes, vol. 23, No. 4, pp. 56-60, 1998.*
(Continued)

*Primary Examiner* — Anil Khatri
(74) *Attorney, Agent, or Firm* — Meyertons, Hood, Kivlin, Kowert & Goetzel, P.C.

(57) ABSTRACT

An applet server accepts requests for applets from client computers. A request specifies the format in which an applet is to be delivered to the requesting client computer. The applet server has a cache used to store applets for distribution to client computers. If the specified form of the requested applet is available in the cache, the applet server transmits the applet to the requesting client. If the applet is not available in the cache, the server will attempt to build the applet from local resources (program code modules and compilers) and transformer programs (verifiers and optimizers). If the applet server is able to build the requested applet, it will transmit the applet to the requesting client computer. If the applet server is unable to build the requested applet, it will pass the request to another applet server on the network for fulfillment of the request.

9 Claims, 3 Drawing Sheets

Related U.S. Application Data continuation of application No. 13/269,905, filed on Oct. 10, 2011, now Pat. No. 8,856,779, which is a continuation of application No. 11/933,161, filed on Oct. 31, 2007, now Pat. No. 8,056,075, which is a continuation of application No. 11/241,985, filed on Oct. 4, 2005, now Pat. No. 7,774,740, which is a continuation of application No. 09/968,704, filed on Oct. 1, 2001, now Pat. No. 6,976,248, which is a continuation of application No. 09/040,972, filed on Mar. 18, 1998, now Pat. No. 6,324,685.

(52) U.S. Cl.
CPC ........ *G06F 9/44589* (2013.01); *H04L 63/123* (2013.01); *H04L 63/20* (2013.01); *H04L 67/10* (2013.01); *H04L 67/2842* (2013.01); *H04L 67/34* (2013.01)

(58) Field of Classification Search
USPC .................................. 717/168–178; 709/203
See application file for complete search history.

(56) References Cited

U.S. PATENT DOCUMENTS

| | | |
|---|---|---|
| 5,740,430 A | 4/1998 | Rosenberg et al. |
| 5,761,421 A | 6/1998 | van Hoff et al. |
| 5,805,829 A | 9/1998 | Cohen et al. |
| 5,828,840 A | 10/1998 | Cowan et al. |
| 5,835,712 A | 11/1998 | DuFresne |
| 5,842,040 A | 11/1998 | Hughes et al. |
| 5,848,246 A | 12/1998 | Gish |
| 5,848,274 A | 12/1998 | Hamby et al. |
| 5,872,915 A | 2/1999 | Dykes et al. |
| 5,884,078 A | 3/1999 | Faustini |
| 5,896,383 A | 4/1999 | Wakeland |
| 5,911,776 A | 6/1999 | Guck |
| 5,918,013 A | 6/1999 | Mighdoll et al. |
| 5,920,725 A | 7/1999 | Ma et al. |
| 5,923,885 A | 7/1999 | Johnson et al. |
| 5,926,631 A | 7/1999 | McGarvey |
| 5,943,496 A | 8/1999 | Li et al. |
| 5,944,784 A | 8/1999 | Simonoff et al. |
| 5,973,696 A * | 10/1999 | Agranat ............... G06F 8/34 707/E17.118 |
| 5,983,348 A | 11/1999 | Ji |
| 5,987,256 A | 11/1999 | Wu et al. |
| 5,991,299 A | 11/1999 | Radogna et al. |
| 5,995,756 A * | 11/1999 | Herrmann .......... G06F 9/44526 709/216 |
| 5,996,022 A | 11/1999 | Krueger et al. |
| 6,032,150 A | 2/2000 | Nguyen |
| 6,035,339 A | 3/2000 | Agraharam et al. |
| 6,067,575 A | 5/2000 | McManis et al. |
| 6,094,679 A | 7/2000 | Teng et al. |
| 6,105,063 A | 8/2000 | Hayes, Jr. |
| 6,112,250 A | 8/2000 | Appelman |
| 6,119,165 A | 9/2000 | Li et al. |
| 6,122,666 A | 9/2000 | Beurket et al. |
| 6,130,917 A | 10/2000 | Monroe |
| 6,167,441 A | 12/2000 | Himmel |
| 6,195,794 B1 | 2/2001 | Buxton |
| 6,212,673 B1 | 4/2001 | House et al. |
| 6,230,184 B1 | 5/2001 | White et al. |
| 6,253,228 B1 | 6/2001 | Ferris et al. |
| 6,279,151 B1 | 8/2001 | Breslau et al. |
| 6,282,702 B1 | 8/2001 | Ungar |
| 6,292,827 B1 | 9/2001 | Raz |
| 6,295,643 B1 | 9/2001 | Brown et al. |
| 6,317,781 B1 | 11/2001 | De Boor et al. |
| 6,321,377 B1 | 11/2001 | Beadle et al. |
| 6,324,685 B1 | 11/2001 | Balassanian |
| 6,327,701 B2 | 12/2001 | Ungar |
| 6,330,710 B1 | 12/2001 | O'Neil et al. |
| 6,336,213 B1 | 1/2002 | Beadle et al. |
| 6,367,077 B1 | 4/2002 | Brodersen et al. |
| 6,374,305 B1 | 4/2002 | Gupta et al. |
| 6,381,742 B2 | 4/2002 | Forbes et al. |
| 6,434,745 B1 | 8/2002 | Conley, Jr. et al. |
| 6,446,081 B1 | 9/2002 | Preston |
| 6,502,236 B1 | 12/2002 | Allen et al. |
| 6,546,554 B1 | 4/2003 | Schmidt et al. |
| 6,578,084 B1 | 6/2003 | Moberg et al. |
| 6,594,820 B1 | 7/2003 | Ungar |
| 6,606,744 B1 * | 8/2003 | Mikurak ............... H04L 29/06 717/174 |
| 6,611,858 B1 | 8/2003 | Aravamudan et al. |
| 6,636,900 B2 | 10/2003 | Abdelnur |
| 6,643,683 B1 | 11/2003 | Drumm et al. |
| 6,650,632 B1 | 11/2003 | Volftsun et al. |
| 6,704,926 B1 | 3/2004 | Blandy et al. |
| 6,718,364 B2 | 4/2004 | Connelly et al. |
| 6,718,540 B1 | 4/2004 | Azua et al. |
| 6,741,608 B1 | 5/2004 | Bouis et al. |
| 6,742,165 B2 | 5/2004 | Lev et al. |
| 6,745,386 B1 | 6/2004 | Yellin |
| 6,754,693 B1 | 6/2004 | Roberts et al. |
| 6,757,894 B2 | 6/2004 | Eylon et al. |
| 6,760,748 B1 * | 7/2004 | Hakim .................. G09B 5/14 434/350 |
| 6,766,366 B1 | 7/2004 | Schafer et al. |
| 6,772,408 B1 | 8/2004 | Velonis et al. |
| 6,772,413 B2 | 8/2004 | Kuznetsov |
| 6,785,730 B1 | 8/2004 | Taylor |
| 6,789,252 B1 | 9/2004 | Burke et al. |
| 6,802,061 B1 | 10/2004 | Parthasarathy et al. |
| 6,832,263 B2 | 12/2004 | Polizzi et al. |
| 6,836,889 B1 | 12/2004 | Chan et al. |
| 6,842,897 B1 | 1/2005 | Beadle et al. |
| 6,865,732 B1 | 3/2005 | Morgan |
| 6,865,735 B1 | 3/2005 | Sirer et al. |
| 6,910,128 B1 | 6/2005 | Skibbie et al. |
| 6,947,943 B2 | 9/2005 | DeAnna et al. |
| 6,950,850 B1 | 9/2005 | Leff et al. |
| 6,976,248 B2 | 12/2005 | Balassanian |
| 6,990,513 B2 | 1/2006 | Belfiore et al. |
| 6,993,743 B2 | 1/2006 | Crupi et al. |
| 6,996,817 B2 | 2/2006 | Birum et al. |
| 7,051,315 B2 | 5/2006 | Artzi et al. |
| 7,069,294 B2 | 6/2006 | Clough et al. |
| 7,127,700 B2 | 10/2006 | Large |
| 7,130,910 B2 * | 10/2006 | Urien ............... G06F 17/30899 707/E17.119 |
| 7,131,111 B2 | 10/2006 | Passanisi |
| 7,131,122 B1 | 10/2006 | Lakhdhir |
| 7,136,896 B1 | 11/2006 | Srinivas et al. |
| 7,150,015 B2 * | 12/2006 | Pace .................... G06F 8/60 709/236 |
| 7,155,715 B1 | 12/2006 | Cui et al. |
| 7,281,245 B2 | 10/2007 | Reynar et al. |
| 7,284,160 B2 * | 10/2007 | Skog ................. G06F 11/0709 714/43 |
| 7,305,672 B2 * | 12/2007 | Vincent ................ G06F 8/67 717/169 |
| 7,346,655 B2 | 3/2008 | Donoho et al. |
| 7,415,706 B1 | 8/2008 | Raju et al. |
| 7,434,215 B2 | 10/2008 | Boykin et al. |
| 7,444,629 B2 | 10/2008 | Chirakansakcharoen et al. |
| 7,472,171 B2 | 12/2008 | Miller et al. |
| 7,493,591 B2 | 2/2009 | Charisius et al. |
| 7,519,684 B2 | 4/2009 | Backhouse et al. |
| 7,523,158 B1 | 4/2009 | Nickerson et al. |
| 7,530,050 B2 | 5/2009 | Mohan et al. |
| 7,536,686 B2 * | 5/2009 | Tan ..................... G06F 8/61 713/100 |
| 7,562,346 B2 | 7/2009 | Jhanwar et al. |
| 7,562,358 B2 | 7/2009 | Bennett et al. |
| 7,574,707 B2 * | 8/2009 | Bozak .................. G06F 8/61 709/201 |
| 7,590,643 B2 | 9/2009 | Demiroski et al. |
| 7,614,052 B2 | 11/2009 | Wei |
| 7,624,394 B1 | 11/2009 | Christopher, Jr. |

(56) References Cited

U.S. PATENT DOCUMENTS

| | | | |
|---|---|---|---|
| 7,661,103 B2* | 2/2010 | Hayward | G06F 17/30569 709/246 |
| 7,665,082 B2 | 2/2010 | Wyatt et al. | |
| 7,703,093 B2 | 4/2010 | Fischer et al. | |
| 7,707,571 B1 | 4/2010 | Harris et al. | |
| 7,721,283 B2 | 5/2010 | Kovachka-Dimitrova et al. | |
| 7,730,482 B2 | 6/2010 | Illowsky et al. | |
| 7,761,865 B2* | 7/2010 | Stienhans | G06F 8/65 715/229 |
| 7,774,742 B2 | 8/2010 | Gupta et al. | |
| 7,779,408 B1* | 8/2010 | Papineau | H04W 4/00 709/219 |
| 7,814,142 B2 | 10/2010 | Mamou et al. | |
| 7,814,475 B2 | 10/2010 | Cohen et al. | |
| 7,925,898 B2* | 4/2011 | Shear | G06F 21/10 713/156 |
| 7,934,212 B2 | 4/2011 | Lakhdhir | |
| 7,984,121 B2 | 7/2011 | Konopka et al. | |
| 7,991,834 B2 | 8/2011 | Ferris et al. | |
| 8,056,075 B2 | 11/2011 | Balassanian | |
| 8,099,502 B2* | 1/2012 | Genske | G06F 9/4411 709/217 |
| 8,127,274 B2 | 2/2012 | Astheimer | |
| 8,146,077 B2* | 3/2012 | McNally | G06F 17/30905 715/810 |
| 8,285,777 B2 | 10/2012 | Giles et al. | |
| 8,327,351 B2* | 12/2012 | Paladino | G06F 8/71 717/106 |
| 8,392,906 B2 | 3/2013 | Broussard et al. | |
| 8,392,912 B2 | 3/2013 | Davis et al. | |
| 8,418,170 B2 | 4/2013 | Saxton et al. | |
| 8,490,082 B2 | 7/2013 | Moore et al. | |
| 8,499,278 B2 | 7/2013 | Hughes | |
| 8,612,966 B2 | 12/2013 | Huff et al. | |
| 8,615,545 B1 | 12/2013 | Lakhdhir | |
| 8,762,988 B2 | 6/2014 | Kong et al. | |
| 8,826,266 B2 | 9/2014 | Little | |
| 8,832,679 B2 | 9/2014 | Suchy et al. | |
| 8,856,800 B2* | 10/2014 | Vecera | G06F 9/505 709/226 |
| 8,862,660 B1* | 10/2014 | Fausak | H04L 67/42 709/200 |
| 8,863,114 B2 | 10/2014 | Shah | |
| 8,954,952 B2 | 2/2015 | Guizar | |
| 9,223,634 B2* | 12/2015 | Chang | G06F 9/45558 |

FOREIGN PATENT DOCUMENTS

| | | |
|---|---|---|
| JP | H10-74153 | 3/1998 |
| JP | H10-289215 | 10/1998 |
| WO | 99/35799 | 7/1999 |

OTHER PUBLICATIONS

Dexter, "On Automated Checking of Java Applets", ACM, pp. 84-96, 2000.*

Jun et al, "Automated Routing Protocol Selection in Mobile Ad Hoc Networks", ACM, pp. 906-913, 2007.*

Barford et al, "A Performance Evaluation of Hyper Text Transfer Protocols ", ACM, pp. 188-197, 1999.*

Kolb, "Making Revisions Hyper-Visible", ACM, pp. 113-116, 2008.*

Wills et al, "An Agile Hypertext Design Methodology", ACM, pp. 181-184, 2007.*

Akhani et al, "Negotiation for Resource Allocation in IaaS Cloud", ACM, pp. 1-7, 2011.*

Chen Ding, et al., "Selective Java Applet Filtering on Internet," IEEE, 1999, pp. II-110-II-114.

Andrew Yang, et al., "Developing Integrated Web and Database Applications a Using JAVA Applets and JDBC Drivers," ACM, 1998, pp. 302-306.

Jesse M. Heines, "Enabling XML Storage from Java Applets in a GUI Programming Course," ACM, The SIGCSE Bulletin, vol. 35, No. 2, 2003, pp. 88-93.

Johannes Schlumberger, et al., "Jarhead Analysis and Detection of Malicious Java Applets," ACM, 2012, pp. 249-258.

Roberto Barbuti, et al, "Java Bytecode Verification on Java Cards," ACM, 2004, pp. 431-438.

Exhibits 1-26, Defendant Microsoft Corporation's Invalidity Contentions Pursuant to Patent L.R. 3-3, *Implicit Networks, Inc.* (Plaintiff) vs. *Sybase, Inc. and Microsoft Corporation*, (Defendants), United States District Court Northern District of California San Francisco Division (Oct. 1, 2009), [Case No. 09-cv-01478].

Exhibits B1-B21, Defendant Microsoft Corporation's Invalidity Contentions Pursuant to Patent L.R. 3-3, *Implicit Networks, Inc.*, (Plaintiff) vs. *Sybase, Inc. and Microsoft Corporation*, (Defendants), United States District Court Northern District of California San Francisco Division (Oct. 1, 2009), [Case No. 09-cv-01478].

James Begole, et al., "Transparent Sharing of Java Applets: A Replicated Approach," ACM UIST, 1997, pp. 55-64.

Newsome, et al., "Proxy Compilation of Dynamically Loaded Java Classes with MoJo," ACM LCTES '02-SCOPES '02, Jun. 19-21, 2002, pp. 204-212.

Benton, et al., "Compiling Standard ML to Java Bytecode," ACM ICFP, 1998, pp. 129-140.

Ahem, et al., "Formalising Java RMI with Explicit Code Mobility," ACM OOPSLA, Oct. 16-20, 2005, pp. 403-422.

Kang, et al., "Query Type Classification for Web Documents Retrieval," ACM SIGIR, Jul. 28-Aug. 1, 2003, pp. 64-71.

Mukhtar, et al., "A Client Side Measurement Scheme for Request Routing in Virtual Open Content Delivery Networks," IEEE, 2003, pp. 235-242.

Olshefski, et al., "Understanding the Management of Client Perceived Response Time," ACM SIGMetrics/Performance, Jun. 26-30, 2006, pp. 240-251.

Wirthlin, et al., "Web-Based IP Evaluation and Distribution Using Applets," IEEE Transactions on Computer-Aided Design of Integrated Circuits and Systems, vol. 22, No. 8, Aug. 2003, pp. 985-994.

Bonisch, et al., "Server Side 'Compresslets' for Internet Multimedia Streams," IEEE, 1999, pp. 82-86.

Lai, et al., "On the Performance of Wide-Area Thin-Client Computing," ACM Transactions on Computer Systems, vol. 24, No. 2, May 2006, pp. 175-209.

Emin Gun Sirer, et al., "Distributed Virtual Machines: A System Architecture for Network Computing," Dept. of Computer Science & Engineering, University of Washington, Feb. 26, 1998, 4 pages.

Emin Gun Sirer, et al., "Design and Implementation of a Distributed Virtual Machine for Networked Computers," 17th ACM Symposium on Operating System Principles, published as Operating Systems Review, 34(5), Dec. 1999, pp. 202-216.

Defendant Microsoft Corporation's Invalidity Contentions Pursuant to Patent L.R. 3-3, *Implicit Networks, Inc.*, (Plaintiff) vs. *Sybase, Inc. and Microsoft Corporation*, (Defendants), United States District Court Northern District of California San Francisco Division (Oct. 1, 2009), including Exhibits A & B, 12 pages. [Case No. 09-cv-01478].

Eric A. Meyer and Peter Murray, "Borealis Image Server," In Proceedings of the Fifth International World Wide Web Conference; Computer Networks and ISDN Systems, V. 28, Nos. 7-11, May 6-10, 1996, pp. 1123-1137. [Retrieved from hltp:l/meyerweb.com/eric/talks/www5/borealis/html Mar. 18, 2014].

Marc H. Brown and Marc A. Najork, "Distributed Active Objects," In Proceedings of the Fifth International World Wide Web Conference; Computer Networks and ISDN Systems, V. 28, Nos. 7-11, May 6-10, 1996, pp. 1037-1052. [Retrieved from ftp://gatekeeper.research.compaq.com/pub/ddec/SRC/research-reports/SRC-141 a.html Mar. 18, 2014].

Michael P. Plezbert and Ron K. Cytron, "Does "Just in Time" = "Beller Late than Never"?" In Proceedings of the 24th ACM SIGPLAN-SIGACT Symposium on Principles of Programming Languages, Jan. 15-17, 1997, pp. 120-131.

Anawat Chankhunthod, et al., "A Hierarchical Internet Object Cache," In Proceedings of the Annual Technical Conference on USENIX 1996, Jan. 22-26, 1996,11 pages.

(56) References Cited

OTHER PUBLICATIONS

Evangelos P. Markatos, "Main Memory Caching of Web Documents," In Proceedings of the Fifth International World Wide Web Conference; Computer Networks and ISDN Systems, V. 28, Nos. 7-11, May 6-10, 1996, 15 pages. [Retrieved from hltp:l/archvlsi.ics.forth.gr/papers/www5/0verview.html Mar. 18, 2014].

M. Frans Kaashoek, et al., "Server Operating Systems," In Proceedings of the 7th Workshop on ACM SIGOPS European Workshop: Systems Support for Worldwide Applications, Sep. 9-11, 1996, pp. 141-148.

Barron C. Housel, et al., "WebExpress: A System for Optimizing Web Browsing in a Wireless Environment," In Proceedings of the 2nd Annual International Conference on Mobile Computing and Networking, Nov. 1996, pp. 108-116.

Thomas T. Kwan, et al., "NCSA's World Wide Web Server: Design and Performance," Computer, V. 28 No. 11, Nov. 1995, pp. 68-74.

Jonathan Trevor, et al., "Exorcising Daemons: A Modular and Lightweight Approach to Deploying Applications on the Web," In Proceedings of the Fifth International World Wide Web Conference; Computer Networks and ISDN Systems, V. 28, Nos. 7-11, May 6-10, 1996, pp. 1053-1062. [Retrieved from http://www.ra.ethz.ch/CDstore/www5/www363/overview.htm Mar. 18, 2014].

Robert Thau, "Design Considerations for the Apache Server API," In Proceedings of the Fifth International World Wide2 Web Conference; Computer Networks and ISDN Systems, V. 28, Nos. 7-11, May 6-10, 1996, 13 pages. [Retrieved from http://iw3c2.cs.ust.hkIWWW5/www5conf.inria.fr/fich html/papers/P20/0verview.html Mar. 18, 2014].

Defendant Hewlett-Packard Company's Invalidity Contentions, *Implicit Networks, Inc.*, (Plaintiff) v. *Hewlett-Dackard Company*, (Defendant), United States District Court Northern District of California San Francisco Division (Jun. 30, 2011), 27 pages. [Case No. 3:10-CV-3746 SI].

Steve McCanne and Van Jacobson, "vic: A Flexible Framework for Packet Video," Proceedings of the third ACM International Conference on Multimedia, ACM Multimedia 95—Electronic Proceedings, Nov. 5-9, 1995, 19 pages.

Dan Decasper, et al., "Router Plugins a Software Architecture for next Generation Routers," Computer Communication Review, a publication of ACM SIGCOMM, vol. 28 No. 4, Oct. 1998, pp. 229-240.

David Mosberger, "Scout: a Path Based Operating System," Doctoral Dissertation Submitted to the University of Arizona, 1997, pp. 110-174.

Ion Stoica and Hui Zhang, "LIRA: An Approach for Service Differentiation in the Internet," Proceedings of the 8th International Workshop on Network and Operating Systems Support for Digital Audio and Video, Jul. 8-10, 1998, 14 pages.

Oliver Spatscheck, "Defending Against Denial of Service Attacks in Scout," Proceedings of the 3rd Symposium on Operating Systems Design and Implementation, Feb. 1999,15 pages.

Peter Deutsch, et al.. "GZIP file format specification version 4.3." Network Working Group, RFC 1952, May 1996, 24 pages. [Retrieved from http://lools.ietf.org/html/rfc1952 Mar. 18, 2014].

Kamran Husain and Jason Levitt, "Javascript Developer's Resource—client-side programming using HTML, netscape plug-ins and Java applets," Prentice-Hall Inc., ISBN 0-13-267923-X, 1997, pp. 16, 141, 391-393, 416-418, 420, 428.

Netscape LiveWire Developer's Guide, Version 2.0 Part No. UMI51-02274-00, 1996, 190 pages.

Douglas Kramer, "The JavaTM Platform," A White Paper, JavaSoft, May 1996, 25 pages.

Brian N. Bershad, et al., "Process for Rewriting Executable Content on a Network Server or Desktop Machine in Order to Enforce Site Specific Properties," U.S. Appl. No. 60/061,387, filed Oct. 7, 1997, pp. 1-8.

Emin Gun Sirer, "Kimera: A System Architecture for Networked Computers," Department of Computer Science and Engineering, University of Washington, 1997, 2 pages.

Emin Gun Sirer, et al., "Kimera Architecture," Department of Computer Science and Engineering, University of Washington 1997, 4 pages.

Jonathan Aldrich, et al., "Static Analyses for Eliminating Unnecessary Synchronization from Java Programs," Department of Computer Science and Engineering, University of Washington, 1999, 20 pages.

Microsoft Active Server Pages: Frequently Asked Questions, Microsoft Corporation, Sep. 1997, MS/IMPLICIT0002318, 4 pages.

Microsoft Internet Information Server—Web Server for Windows NT Operating System: Reviewer's Guide, Reviewing and Evaluating Microsoft Internet Information Server version 3.0, 1996, MS/IMPLICIT0004192, 45 pages.

Emin Gun Sirer, et al., "Improving the Security, Scalability, Manageability and Performance of System Services for Network Computing," Department of Computer Science and Engineering, University of Washington, 1998, 13 pages.

Shishir Gundavaram, CGI Programming on the World Wide Web, ISBN: 1-56592-168-2, 1st Edition, Mar. 1996, 433 pages.

Chuck Musciano and Bill Kennedy, HTML: The Definitive Guide, May 1997, Chapters 1-15, 454 pages. [Retrieved from http://docstor.mik.ua/orelly/web/html/ Jan. 28, 2015].

David Flannagan, JavaScript: The Definitive Guide, Jan. 1997, Chapters 1-20, 343 pages. [Retrieved from http://docstore.mik.ua/orelly/web/jscripll Jan. 28, 2015].

Wall, et al., Programming Perl, Sep. 1996, Chapters 1-9, 516 pages. [Retrieved from http://docstore.mik.ua/orelly/web/perl/ Jan. 28, 2015].

Stephen Spainhour and Valerie Quercia, WebMaster in a Nutshell, Oct. 1996, Chapters 1-26, 403 pages. Retrieved from http://docstore.mik.ua/orelly/web/webnull Jan. 28, 2015].

Michael Baentsch, et al., "WebMake: Integrating distributed software development in a structure-enhanced Web," Computer Networks and ISDN Systems 27 (1995), pp. 789-800.

Dan Decasper, et al., "A Scalable, High Performance Active Network Node," Apr. 1998, 21 pages.

John J. Hartman, et al., "Joust: A Platform for Liquid Software," Computer, IEEE, 1999, pp. 50-56.

David Mosberger, et al., "Making Paths Explicit in the Scout Operating System," Proceedings of the USENIX 2nd Symposium on Operating Systems Design and Implementation, Oct. 1996, 16 pages.

Oliver Spatscheck, et al., "Escort: A Path-Based OS Security Architecture," TR 97-17, Nov. 26, 1997, 17 pages.

Dan Decasper, et al., "DAN: Distrubuted Code Caching for Active Networks," IEEE, 1998, pp. 609-616.

\* cited by examiner

Request Data Type

| Tag | Value |
| --- | --- |
| Appplet - URL | (String) specifies the name of the requested applet. |
| Code -Type | (Source/Intermediate/Binary) specifies the format the applet is to be delivered to the requesting client in. A request for binary would specify the CPU of the requesting client (e.g., x 86) |
| Verification - Level | (0 - 100) specifies the degree of the verification to be performed. 0 = no/minimal verification, 100 = maximum verification (highest level of security). |
| Optimization - Level | (0 - 100) specifies the degree of optimization to be performed. 0 = no/minimal optimization, 100 = maximum optimization. |

FIG. 2B

Code Data Type

| Tag | Value |
| --- | --- |
| Appplet - URL | (String) specifies the name of the requested applet. |
| Code -Type | (Source/Intermediate/Binary) specifies the format the applet is to be delivered to the requesting client in. A request for binary would specify the CPU of the requesting client (e.g., x 86) |
| Verification - Level | (0 - 100) specifies the degree of the verification to be performed. 0 = no/minimal verification, 100 = maximum verification (highest level of security). |
| Optimization - Level | (0 - 100) specifies the degree of optimization to be performed. 0 = no/minimal optimization, 100 = maximum optimization. |
| Applet Length | $(0 - 2^{32})$ specifies the size of the requested applet. |
| Applet Code | The Requested Applet in the form specified by the requested data type. |

FIG. 3

APPLICATION SERVER FOR DELIVERING APPLETS TO CLIENT COMPUTING DEVICES IN A DISTRIBUTED ENVIRONMENT

This application is a continuation of U.S. application Ser. No. 14/507,394, filed Oct. 6, 2014 (now U.S. Pat. No. 9,325,740), which is a continuation of U.S. application Ser. No. 13/269,905, filed Oct. 10, 2011 (now U.S. Pat. No. 8,856,779), which is a continuation of U.S. application Ser. No. 11/933,161, filed October 31, 2007 (now U.S. Pat. No. 8,056,075), which is a continuation of U.S. application Ser. No. 11/241,985, filed Oct. 4, 2005 (now U.S. Pat. No. 7,774,740), which is a continuation of 09/968,704 filed Oct. 1, 2001 (now U.S. Pat. No. 6,976,248), which is a continuation of U.S. application Ser. No. 09/040,972 filed Mar. 18, 1998 (now U.S. Pat. No. 6,324,685); the disclosures of all of the above-referenced applications are incorporated by reference herein in their entireties.

The following application is incorporated by reference in its entirety as if fully set forth herein: U.S. application Ser. No. 11/241,985 filed Oct. 4, 2005.

BACKGROUND

Technical Field

The present invention elates to computer operating system arid, in particular to a server architecture providing application caching and security verification.

Description of the Related Art

The growth of the Internet's importance to business, along with the increased dependence upon corporate networks, has created a demand for more secure and efficient computer systems. The traditional solution to this problem has been to depend upon improvements in hardware performance to make up for the performance penalty that is typically incurred when a computer system is made more secure and stable. Increased interconnectivity has also created a need for improved interoperability amongst a variety of computers that are now connected to one another. One solution to the problem of the variety of computers interconnected via the Internet and corporate networks has been the development of portable architecture neutral programming languages. The most widely known of these is the Java™ programming language, though, there are numerous other-architecture neutral languages.

Architecture neutral programming languages allow programs downloaded from a server computer to a client computer to be interpreted and executed locally. This is possible because the compiler generates partially compiled intermediate byte-code, rather than fully compiled native machine code. In order to run a program, the client machine uses an interpreter to execute the compiled byte-code. The byte-codes provide an architecture neutral object file format, which allows the code to be transported to multiple platforms. This allows the program to be run on any system which implements the appropriate interpreter and run-time system. Collectively, the interpreter and runtime system implement a virtual machine, this structure results in a very secure language.

The security of this system is premised on the ability of the byte-code to be verified independently by the client computer. Using the Java™ programming language or some other virtual machine implementing technology, a client can ensure that the downloaded program will not crash the user's computer or perform operations for which it does not have permission.

The traditional implementations of architecture neutral languages are not without problems. While providing tremendous cross platform support, the current implementations of architecture neutral languages require that every client performs its own verification and interpretation of the intermediate code. The high computation and memory requirements of a verifier, compiler and interpreter restrict the applicability of these technologies to powerful client computers.

Another problem with performing the verification process on the client computer is that any individual within an organization may disable some or of the checks performed on downloaded code. The current structure of these systems makes security management at the enterprise level almost impossible. Since upgrades of security checking software must be made on every client computer, the cost and time involved in doing such upgrades makes it likely that outdated or corrupt copies of the verifier or interpreter exist within an organization. Even when an organization is diligent in maintaining a client based security model, the size of the undertaking in a large organization increases the likelihood that there will be problems.

There is a need for a scalable distributed system architecture that provides a mechanism for client computers to request and execute applets in a safe manner without requiring the client machines to have local resources to compile or verify the code. There is a further need for a system in which the applets may be cached in either an intermediate architecture neutral form or machine specific form in order to increase overall system performance and efficiency.

SUMMARY

In accordance with one embodiment of the invention, an applet server architecture is taught which allows client computers to request and execute applets in a safe manner without requiring the client to have local resources to verify or compile the applet code. Compilation and byte code verification in the present invention are server based and thereby provide more efficient use of resources and a flexible mechanism for instituting enterprise-wide security policies. The server architecture also provides a cache for applets, allowing clients to receive applet code without having to access nodes outside the local network. The cache also provides a mechanism for avoiding repeated verification and compilation of previously requested applet code since any client requesting a given applet will have the request satisfied by a single cache entry.

Machine specific binary code is essentially interpreted code since the processor for a given computer can essentially be viewed as a form of an interpreter, interpreting binary code into the associated electronic equivalents. The present invention adds a level of indirection in the form of an intermediate language that is processor independent. The intermediate language serves as the basis for security verification, code optimizations, or any other compile time modifications that might be necessary. The intermediate form allows a single version of the source to be stored for many target platforms instead of having a different binary fir each potential target computer. Compilations to the target form can either be done at the lime of a cache hit or they can be avoided all together if the target machine is able to directly interpret the intermediate form. if the compilation is done on the server, then a copy of the of the compiled code as well as the intermediate form can be stored in the cache. The performance advantage derived from caching the compiled form as well as the intermediate depends upon the number of clients with the same CPU.

The novel features believed characteristic of the invention are set forth in the appended claims. The invention itself, however, as well as other features and advantages thereof will best be understood by reference to the detailed description which follows, when read in conjunction with the accompanying drawings.

DETAILED DESCRIPTION

Figure 1:
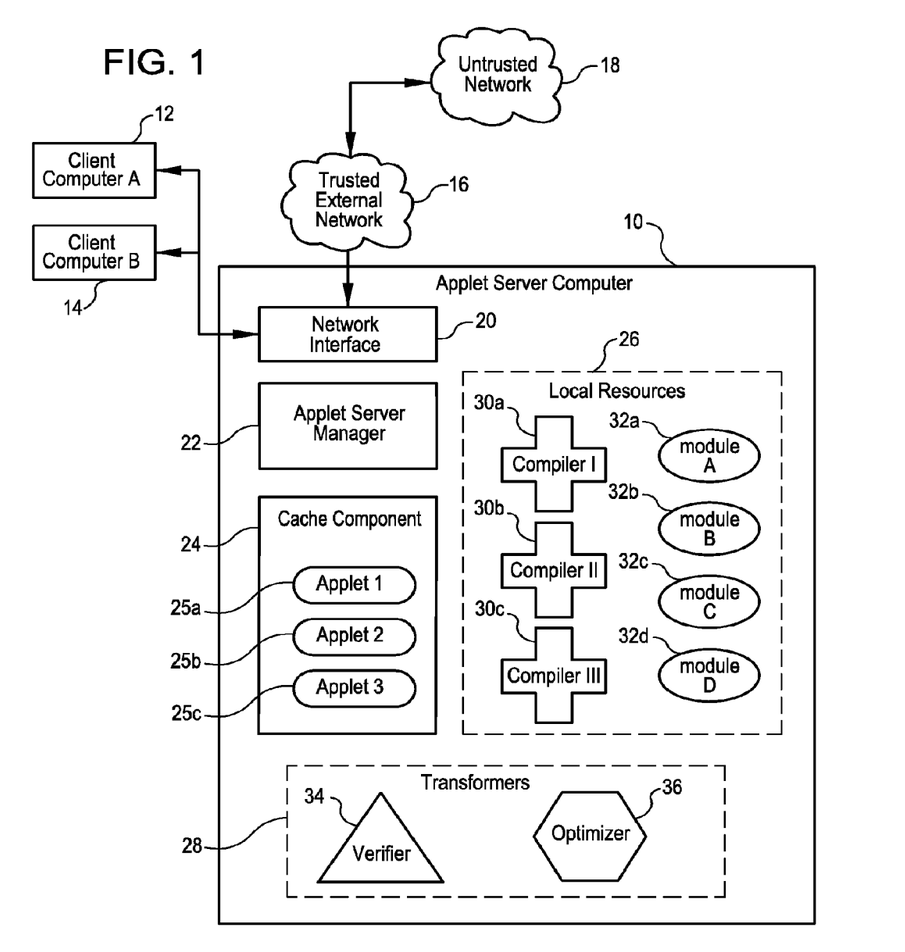
FIG. 1 is diagram showing the major components which may be used to implement an applet server in one embodiment of the present invention.

Referring to FIG. 1, an applet server architecture according to one embodiment of the invention is based on an applet server computer 10 which in turn is connected to client computer A 12, client computer B 14, an external network 16 and an untrusted network 18. The applet server computer 10 connects to client computers 12 and 14, an external network 16, and an untrusted network 18 by means of a network interface 20. Typically this connection will involve one or more of the computers or networks having a connection to the Internet.

The applet server computer 10 accomplishes its objectives by manipulating computer programs in several formats. An applet (e.g. applets 1-3, 25a-25c) is any form of program instructions, whether in binary, source or intermediate format. In the case of this architecture, the applet code can either be a self-contained program, or it can be a code fragment associated with a larger application.

Binary format refers to processor specific machine instructions suitable for running natively on a given computing platform (also referred to as "target" because of the concept of "targeting" a compiler to produce binary code for a given processor type).

Source refers to non-binary applet code, generally in the form of higher level languages (i.e. the C™, C++™, Java™, Visual Basic™, ActiveX™, Fortran™, and Modula™ programming languages).

Intermediate format refers to a common intermediate byte-code that is produced by compiling a given source code put. The intermediate byte-code need not necessarily be Java™ byte-code.

Treating applets in this general sense allows client computers 12 and 14 to request not only applications, but portions of applications. Client computers 12 and 14 are thus able to use applet server computer 10 as the equivalent of a loader, loading in appropriate parts of the application in the form of applets. In turn client computers 12 and 14 can run large applications without requiring that the client computers 12 and 14 have the resources to store the entire application in memory at once.

Having the applets delivered from applet server computer 10 allows code in intermediate form to be verified, optimized, and compiled before being transmitted to client computers 12 and 14. This reduces the amount of work the client computers 12 and 14 have to do and provides a convenient way to impose global restrictions on code.

In operation, client computer A 12 transmits a request to an applet server computer 10 requesting an applet in a particular form. The form may be selected from a large matrix of many possible for that can be recognized by the system. The request specifies the format (source, intermediate, or binary) which the client wishes to receive the applet. The request may also specify that the applet be verified or have some other transformation operation preformed upon it. Verification, optimization and compression are examples of types of transformation operations. The request is received by the network interface 20 of the applet server computer 10 which passes the request onto the applet server manager 22 (e.g., a computer program that may be stored on a non-transitory computer-readable medium).

After interpreting the request, the applet server manager 22 checks to see if the requested applet is available in the cache 24. The cache 24 stores applets in a variety of formats (source, intermediate, or binary). If the requested form of the applet is available in the cache 24 (applet 1 25a, applet 2 25b, or applet 3 25c in this example) the applet server manager 22 instructs the network interface 20 to transmit the applet to requesting client computer A 12.

If the requested applet is not available in the cache 24, then the apple server manager 22 will attempt to build the requested applet from local resources 26 and one or more transformation operations performed by one or more of the transformers 28. Local resources 26 are comprised of compilers 30a, 30b and 30c and program code modules 32a, 32b, 32c and 32d. The requested applet is built by selecting one or more program code modules 32 and compiling them with one or more compilers 30. Transformer operations may be performed by the verifier 34 or the optimizer 36. After the applet server manager 22 builds the applet, the network interface 20 transmits the applet to the requesting client computer A 12.

If the request can not be satisfied by building the applet from local resources 26 and transformers 28, the applet server manager 22 will pass a request for the requested applet to external network 16 and/or untrusted network 18. The applet server manager 22 may request the applet in intermediate form or in executable form or it may request the local resources 26 and transformers 28 it needs to complete building the applet itself.

The cache 24 is capable of responding to the following commands: GET, PUT, and FLUSH. GET is used to retrieve a given applet from the cache. PUT is used to store an applet in the cache. FLUSH is used to clear the cache of one or more entries. When the cache is unable to locate an item in response to a GET operation, it returns a cache miss. The program which issued the GET command is then responsible for locating the desired form of the applet by other means and optionally storing it in the cache when it is retrieved (using the PUT operation). The FLUSH command will clear the cache of one or more entries and any subsequent GETs for the FLUSHed applet code will result in a cache miss. This is useful if a particular applet needs to be updated from a remote server on a periodic basis. When using PUT, the program issuing the command specifies a time to live (TTL) in the cache. When the TTL expires, the cache entry is removed by means of a FLUSH operation.

Local resources 26 are comprised of program modules 32 (applets in source form, not the requested form) and compilers 30. The program modules 32 are run through the compilers 30 in order to produce applets in the requested form. The applet server manager 20 may also direct the modules 32 to be processed by a verifier 34 or another transformer such as an optimizer 36. Program modules 32 are program code used to build applets. Program modules 32 may be stored in local resources 26 in source, binary, or intermediate formats. When an applet is built it may require the operation of one or more compilers 30 upon one or more program modules 32. The program modules 32 may be combined and recompiled with previously cached applets and the resulting applet may also be cached for use at a future time. Additionally, program modules 32, compilers 30 and transformers 28 (including verifiers 34 and optimizers 36) may be distributed across a network. The applet server manager 22 may pass requests for the components it needs to build a particular applet back to the network interface 20 which in turn passes the request onto the rest of the network and may include external network 16 and untrusted network 18.

Figure 3:
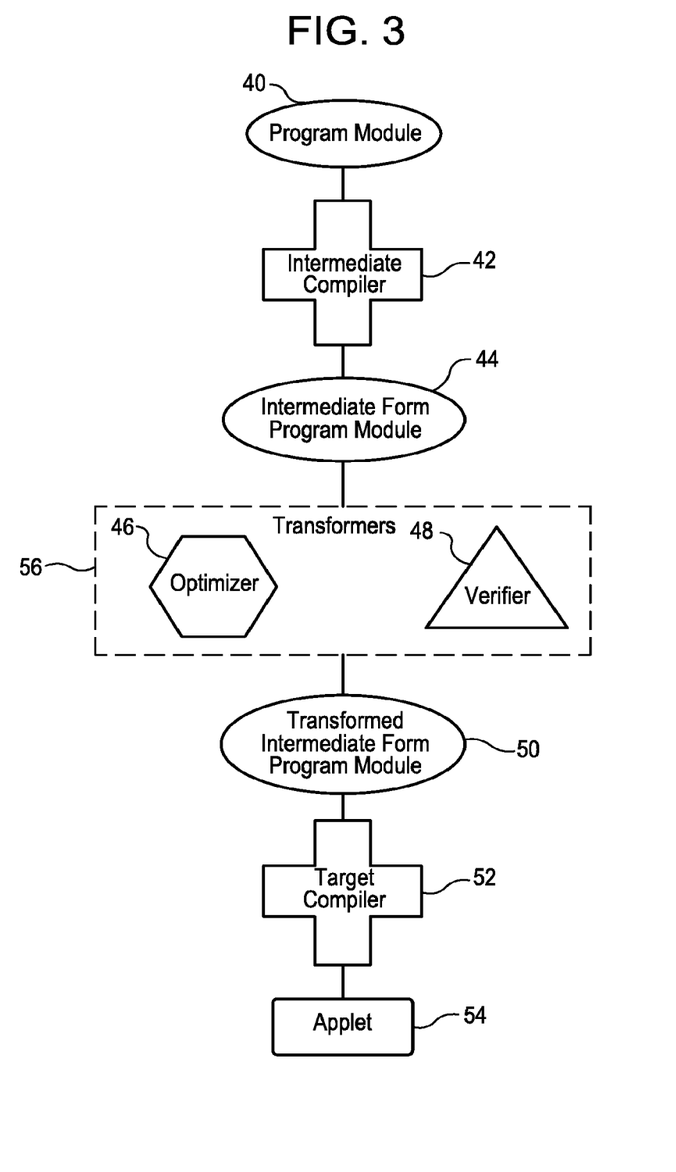
FIG. 3 is a diagram showing the compilation and transformation of a program module into an applet in a particular form.

FIG. 3 provides further illustration of how an applet is produced from local resources and transformers. In this illustration the request is for an optimized and verified applet compiled to a machine specific form. A program module 40 is compiled into an intermediate form program module 44 by an intermediate compiler 42. The intermediate form program module 44 is then transformed by an optimizer 46 or a verifier 48. The resulting transformed intermediate form program module 50 is then compiled by target compiler 52 into machine specific code applet 54.

There are two types of compilers used to build applets: intermediate compilers 42 and target compilers 52. The intermediate compiler 42 compiles program modules (source applet code) 40 and produces a common intermediate pseudo-binary representation of the source applet code (intermediate form program module 44). The word pseudo is used because the intermediate form 44 is not processor specific but is still a binary representation of the source program module 40. This intermediate form can be re-targeted and compiled for a particular processor. Alternatively, the intermediate form 44 can be interpreted by an interpreter or virtual machine that understands the internal binary representation of the intermediate form. A target compiler 52 compiles intermediate applet code 44 into an applet 54 in a processor specific format (binary) suitable for running natively on a given computing platform.

Transformers 56 are programs, which may be stored on a non-transitory computer-readable medium, that take in intermediate code and put out intermediate code. Transformers 56 are generally used for things like verification and optimization. Other transformers might include compressors that identify portions of code that can be replaced with smaller equivalents. Transformers can be matched up to any other component that takes in intermediate code as an input. These include the cache 24 and the target compilers 52. Global policies for transformers 56 can be implemented which ensure that all applets are run through some set of transformers before being returned to the client.

A verifier 48 is a type of transformer that is able to analyze input code and determine areas that might not be safe. The verifier 48 can determine the level of safety. Some verifiers 48 look for areas where unsafe or protected memory is being accessed, others might look for accesses to system resources such as IO devices. Once a verifier 48 determines the portion of unsafe applet code several steps can be taken. The offending code portion can be encased with new code that specifically prevents this unsafe code section from being executed. The unsafe code can be modified to be safe. The unsafe code can be flagged in such a way that a user can be warned about the possible risk of executing the code fragment. The verifier's role can therefore be summarized as determining where unsafe code exists and possibly altering the offending code to render it harmless. Verifiers 48 can operate on any format of input code, whether in source, intermediate or binary form. However, since intermediate code is a common format, it is most efficient to have a single verifier that will operate on code in this format. This eliminates the need to build specific knowledge of various source languages into the verifier. Verifiers 48 are a form of a transformer. Verifiers 48 take in intermediate code and put out verified intermediate code. Verifiers 48 are responsible for identifying non-secure portions of code in the intermediate code and modifying this code to make it secure. Security problems generally include access to memory areas that are unsafe (such as system memory, or memory outside the application space of the applet).

The choice of adding in the verification step can be left up to the client computer 12, the applet server computer 10 (see FIG. 1), or can be based on the network that the applet originated from. Server managers can institute global policies that affect all clients by forcing all applets to be run through the verifier 48. Alternatively, verification can be reserved for untrusted networks (18 in FIG. 1), or it can be left up to the client to determine whether the verification should be performed. In the preferred embodiment, verification levels determined by the applet server 10. In this way, a uniform security policy may be implemented from a single machine (i.e., the applet server 10).

Optimizers 46 are another type of transformer program. Optimizers 46 analyze code, making improvements to well known code fragments by substituting in optimized but equivalent code fragments. Optimizers 46 take in intermediate code 44 and put out transformed intermediate code 50. The transformed intermediate code 50 is functionally equivalent to the source intermediate code 44 in that they share the same structure.

Referring again to FIG. 1, policies may be instituted on the applet server 10 that force a certain set of request parameters regardless of what the client asked for. For example, the applet server manager 22 can run the applet through a verifier 34 or optimizer 36 regardless of whether the client 12 requested this or not. Since the server 10 might have to go to an untrusted network 18 to retrieve a given applet, it evil then run this applet through the required transformers 28, particularly the verifier 34 before returning it to the client 12. Since clients 12 and 14 have to go through the applet server computer 10, this ensures that clients 12 and 14 do not receive applets directly from an untrusted network 18. In addition, since the server will be dealing directly with untrusted network 18, it can be set up to institute policies based on the network. A trusted external network 16 may be treated differently than an untrusted network 18. This will provide the ability to run a verifier 34 only when dealing with an entrusted network 18, but not when dealing with a trusted external network 16. In one embodiment, intermediate code is passed through a verifier 34 and the source of the code merely determines the level of verification applied.

The client 12 is the target computer on which the user wishes to execute an applet. The client 12 requests applets from the server 10 in a specific form. Applets can be requested in various formats including source, intermediate and binary. In addition, an applet can be requested with verification and/or other compile time operations. Optionally, the client 12 can pass a verifier to the server to provide verification, If the server 10 implements its own security, then both the client and server verifiers will be run, The verifier that is passed from the client to the server is cached at the server fix subsequent verification. The client can refer to this verifier by a server-generated handle to avoid having to pass the verifier each time an applet is requested, Client computers 12 and 14 requesting applet code in intermediate format need to have an interpreter or virtual machine capable of interpreting the binary code in the intermediate format if the applet is to be executed on the client machine.

Figure 2A:
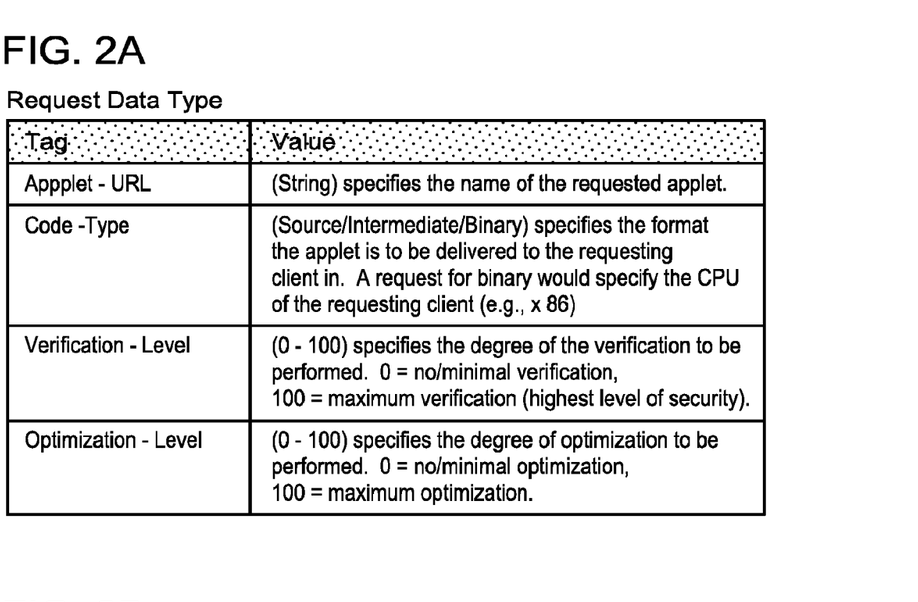
FIG. 2a is a table which illustrates the structure of the request format data type.
Figure 2B:
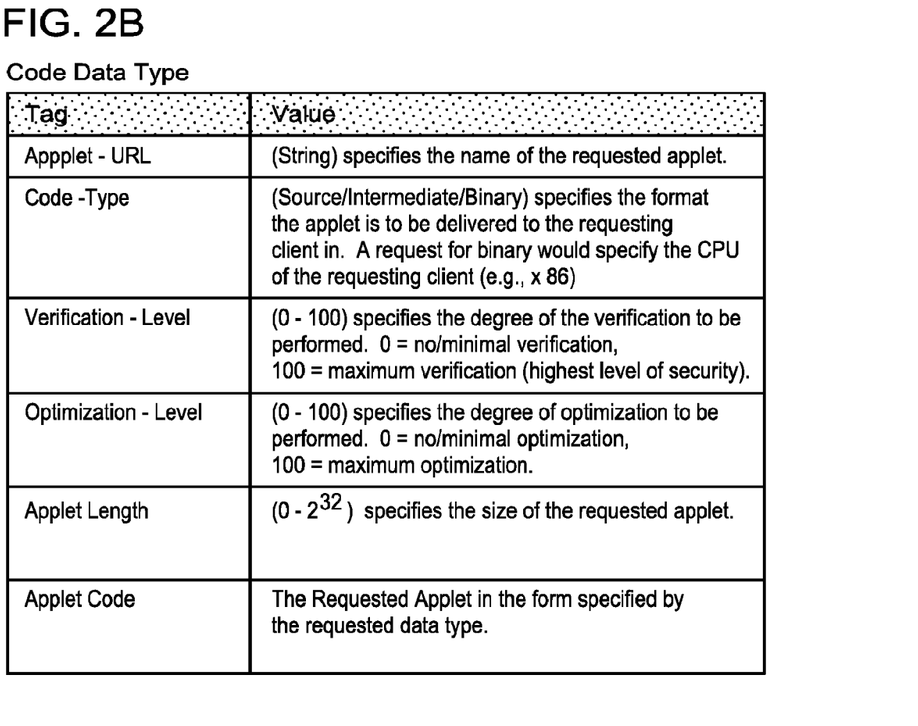
FIG. 2b is a table which illustrates the structure of the returned code data type.

In the preferred embodiment, requests to the applet server are in a format similar to those of an HTTP header and are comprised of tags and values. In one embodiment, an HTTP GET method is used to make the request (though use of the HTTP protocol is not necessary to implement the present invention). The request is made up of a series of tags which specify the requested applet, the platform on which it is to be run and the type of code (source/intermediate/binary), a verification level and an optimization level. New tags and values can be added to extend functionality as needed and the applet server manager 22 will discard any tag it does not recognize. When the applet server computer 10 returns the requested applet to the requesting client computer A 12, it will transmit the request header followed by the applet code. In this instance, the header will additionally include a field which defines the length of the applet code. FIG. 2 provides a table which illustrates the request format and the returned code format.

While this invention has been described with reference to specific embodiments, this description is not meant to limit the scope of the invention. Various modifications of the disclosed embodiments, as well as other embodiments of the invention, will be apparent to persons skilled in the art upon reference to this description. It is therefore contemplated that the appended claims will cover any such modifications or embodiments as fall within the scope of the invention.

What is claimed is:

1. A non-transitory computer-readable storage medium having stored thereon instructions that are executable to cause a computer system to perform operations comprising:
  receiving, at the computer system, a first Hypertext Transfer Protocol (HTTP) GET request from a first client computer for a resource, wherein the first HTTP GET request specifies a platform of the first client computer, and wherein the resource includes source code;
  producing, by the computer system, the resource, wherein the producing includes:
    conveying, by the computer system, a request for the resource to an external network;
    receiving, at the computer system, the resource from the external network; and
    performing, by the computer system, a transformation operation on the resource to create the produced resource, wherein the produced resource includes source code compatible with the platform of the first client computer; and
  sending, by the computer system, the produced resource to the first client computer in response to the first HTTP GET request.

2. The non-transitory computer-readable storage medium of claim 1, wherein the first HTTP GET request includes a request for a specific form of the resource, wherein the specific form of the resource is based on information stored at the first client computer, and wherein the produced resource is the specific form of the resource.

3. The non-transitory computer-readable storage medium of claim 2, wherein the resource is a web page.

4. The non-transitory computer-readable storage medium of claim 2, wherein the resource is an application.

5. The non-transitory computer-readable storage medium of claim 1, wherein the source code in the produced resource is in a high-level programming language.

6. The non-transitory computer-readable storage medium of claim 1, wherein the first client computer is configured to process the produced resource, including by causing the source code to be executed on the first client computer.

7. The non-transitory computer-readable storage medium of claim 1, wherein the transformation operation includes compressing at least a portion of the resource.

8. The non-transitory computer-readable storage medium of claim 1, wherein the transformation operation includes optimizing at least a portion of the resource.

9. The non-transitory computer-readable storage medium of claim 1, wherein the transformation operation includes verifying at least a portion of the resource.

* * * * *